United States Patent [19]

Perret

[11] 4,177,495
[45] Dec. 4, 1979

[54] VARIABLE ELECTRIC CAPACITOR

[75] Inventor: Maurice Perret, Avenches, Switzerland

[73] Assignee: Gesellschaft fur elektronische Rohren Comet Bern, Switzerland

[21] Appl. No.: 823,323

[22] Filed: Aug. 9, 1977

[30] Foreign Application Priority Data

Aug. 25, 1976 [CH] Switzerland ............... 10748/76
Jun. 7, 1977 [CH] Switzerland ............... 6973/77

[51] Int. Cl.² ............................................. H01G 5/14
[52] U.S. Cl. .................................. 361/279; 361/278; 361/296
[58] Field of Search ............... 361/278, 279, 292, 298, 361/296; 29/25.41

[56] References Cited

U.S. PATENT DOCUMENTS

| 1,502,860 | 7/1974 | McCrum | 361/296 |
| 1,807,300 | 5/1931 | Benjamin | 361/296 X |
| 2,479,368 | 8/1949 | Kaar | 361/296 X |
| 2,714,184 | 7/1955 | Peck | 361/279 |
| 2,740,077 | 3/1956 | Clarke | 361/279 |
| 3,700,983 | 10/1972 | Goetzl | 361/296 X |

FOREIGN PATENT DOCUMENTS

| 105396 | 10/1938 | Australia | 361/297 |
| 600098 | 3/1948 | United Kingdom | 361/296 |

Primary Examiner—E. A. Goldberg
Attorney, Agent, or Firm—Watson, Cole, Grindle & Watson

[57] ABSTRACT

A variable electric capacitor has two electrode units consisting of a plurality of plates or a single spirally wound plate with several turns. The plates or turns have opposite lateral edges, one of which is free and the other is fixed to a support. The plates or turns of the two electrode units are interleaved and to change their mesh, one electrode unit is movable relative to the other. Each electrode unit has locating elements for the free lateral edge of plate or turn of the other electrode unit. These locating elements adjoin the supports of the electrode unit concerned and are formed to hold the free lateral edge of each plate or turn of the other electrode unit in a predetermined position when both electrode units are in their maximum mesh position.

6 Claims, 16 Drawing Figures

VARIABLE ELECTRIC CAPACITOR

BACKGROUND OF THE INVENTION

1. Field of the Invention

The invention concerns an electric capacitor with two electrode units each of which consists of a plurality of capacitor plates having paired mutually opposite surfaces, and where each plate has two mutually opposite lateral edges. One of these edges is free while the other is joined to a carrier or support and is so held by the latter that a gap is formed between the mutually oppositely positioned surfaces of the plates of each electrode unit, this gap being greater than the thickness of the plates of the other electrode unit. Further, the plates of one electrode unit extend into the gaps between the plates of the other electrode unit. In order to vary the depth of extension of the plates into the gap between these plates all such plates of both electrode units are arranged in parallel with a straight line along which their mutual position can be set.

2. Description of the Prior Art

In known capacitors of the type described above, the electrode units consist of several planar or cylindrical capacitor plates, as described e.g. in British patent specification No. 1 277 341.

There are also, however, capacitors of the above-mentioned type wherein each electrode unit consists of a single band-shaped capacitor plate which is wound into a spiral and the turns of such capacitor plates of one electrode unit are disposed in the gap between the turns of the capacitor plate of the other electrode unit, as shown e.g. in U.S. Pat. No. 1,590,678 or 3,284,682.

In each of these known cases the exact alignment of the capacitor plates, or of the turns of the capacitor plates of one electrode unit in relation to the plates or turns of the plate of the other electrode unit presents certain difficulties. Ideally, the plates or rather, the turns of the plate of one electrode unit ought to be positioned exactly in the middle of the gaps between the plates or turns of the plates of the other electrode unit; in practice, this is seldom possible.

SUMMARY OF THE PRESENT INVENTION

The invention aims to develop an electric capacitor of the above-described type in such fashion that the exact alignment of the capacitor plates, and of the turns of the capacitor plates can be carried out quickly, easily and in a relatively simple way.

According to one aspect of the invention this aim is sought to be achieved by the provision of an electric capacitor comprising two electrode units, a plurality of capacitor plates in each electrode unit arranged in pairs with mutually oppositely facing surfaces, a support for each capacitor plate, two oppositely positioned lateral edges formed on each capacitor plate, one of the two lateral edges being free while the other is fixedly secured to the support so that a gap is defined between the opposite surfaces of the plates of the electrode units, said gap being greater than the thickness of the plates of the other electrode unit, the capacitor plates of the two electrode units being intermeshable, the capacitor plates of both electrode and arranged in parallel with a straight line along which one electrode unit is adjustable relative to the other, and means for varying the extent of intermeshing of the capacitor plates; and wherein the improvement includes the provision of:

guiding means on each electrode unit for the free lateral edge of each of the capacitor plates of the other electrode unit, said guiding means being arranged adjoiningly to the support of the associated electrode unit, the free lateral edge of each of the plates of the other electrode unit being disposed in a predetermined position relative to the capacitor plates of the first electrode unit when the electrode units are set to the maximum extent intermeshing of their capacitor plates while in other settings of the electrode units the guiding means are out of mesh with the plates of the other electrode unit.

The locating or guiding means for the free lateral edges of the capacitor plates may at least partly consist of a respective laterally offset shoulder on each plate-part; or of a collar-shaped part of the carrier or support member of the electrode unit in question; or of the flanks of a groove of a body connected to the carrier or support member of the relevant electrode unit.

Furthermore, another aspect of the invention concerns a process for the assembly of an electric capacitor of the type set forth above, which aspect seeks to solve another problem, namely facilitating the mounting of the two electrode units into a housing by adjusting the capacitor plate-parts of both electrode units to an exactly aligned mutual position from the starting of the mounting procedure and holding them in that position during the fitting of the electrode units into the housing.

According to this aspect of the invention, the process seeking to solve this problem comprises meshing the two electrode units with one another until the free lateral edges of the capacitor plates of one electrode unit are engaged in the guiding means of the second electrode unit and, conversely, the free lateral edges of the capacitor plates of the second electrode unit are engaged in the guiding means of the first electrode unit, fitting the two electrode units together into a housing and finally retracting the electrode units into their operating position in which the electrode units are out of engagement with one another.

Expediently, when the capacitor plate-parts of the both electrode units are interleaved or in mesh with one another so that the free lateral edges of the plate-parts are in engagement with the locating or guiding means of the other electrode unit, the capacitor plate parts are pressed to the associated carrier or support by virtue of being pushed into one another, in this position they are then secured to the support or carrier by brazing or welding.

Further details and advantages of special embodiments of the invention are described in the claims, in the following detailed description and in the drawings.

BRIEF DESCRIPTION OF THE DRAWINGS

The invention is described, purely by way of example, with reference to preferred embodiments illustrated in the accompanying drawings, wherein.

DESCRIPTION OF THE PREFERRED EMBODIMENTS

The electric vacuum capacitor shown in FIG. 1 consists of two electrode units 21 and 22, which are described in detail further below. Both electrode units are accommodated in the interior of a gas-tight evacuated housing 23. The housing 23 has a cylindrical jacket 24 of ceramic material or of glass for electrical insulation and is connected at its ends to metallic jacket members known as bells 25 and 26. A base plate 27 is inserted into the lower jacket member 25. In the middle of this base plate 27 there is a pinch-seal tubulation of tip-off nipple 28 of glass or metal, which is surrounded on the outside by a protective cap 29. One of the electrode units 21 is arranged on the inside face of base plate 27 and is rigidly secured thereto. A cover plate 30 is inserted into the upper bell 26. The middle part of the cover 30 is pierced and connected to a tube 31 extending coaxially within the housing 23. The tube piece 31 serves for guiding for an axially displaceable tubular member 32 the lower end of which carries a disc 33 to which the second electrode unit 22 is fastened. The two tubular members 31 and 32 are surrounded by an electrically conducting elastic bellows 34, each end of which has a respective end flange 35 and 36 which are respectively fastened to the cover plate 30 and to the disc 33.

A screw spindle 37 is provided for the axial displacement of the inner tube 32 and of the electrode unit 21 connected to it. The screw spindle is pivotally journalled in a housing attachment 39 by means of an axial-thrust ball bearing 38. The threads of spindle 37 mesh with corresponding internal threads of an axially through-bored nut piece 40 fixed in the upper end part of the inner tubular member 32. The screw spindle 37 has an outwardly projecting extension 41 which is provided with means (not shown) to turn the spindle 37 by hand or by a motor.

Figure 2:
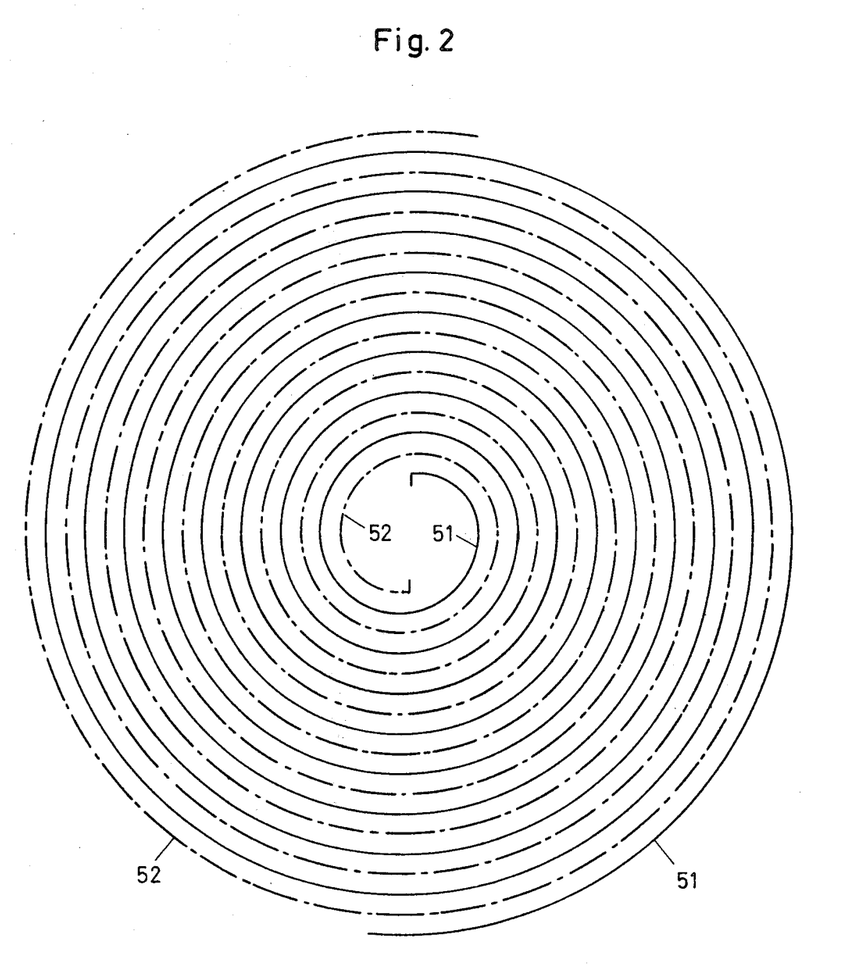
FIG. 2 shows schematically and on an enlarged scale a cross-section across the plane II—II of FIG. 1.

Each of the electrode units 21 and 22 consist of a single band-shaped capacitor plate 51, 52 respectively which, as shown in the schematic illustration in FIG. 2, is coiled into a spiral. The successive turns of this spiral have a distance or gap from one another which is constant and larger than the thickness of capacitor plates 51, 52. In FIG. 2 one of the spirally wound capacitor plates 51 is indicated by a full line while the other, similarly spirally coiled capacitor plate 52 is shown by a chain line so as to enable the two capacitor plates to be distinguished from each other. The two coiled capacitor plates 51 and 52 have exactly the same shape and are coaxially arranged such that one capacitor plate 51 is offset or turned by 180° relative to the other capacitor plate 52.

To secure a constant distance between the adjacent turns of each of the capacitor plates 51 and 52 a distance-holder or spacer is arranged along that longitudinal edge of the relevant band-shaped plates, which is connected to the base plate 27 and to the disc 33. In the embodiment illustrated in FIG. 1, the spacer consists of two adjacently extending profile bars 53 and 54. The band-shaped capacitor plates 51 and 52 and the spacing profile bars 53 and 54 are made of low oxygen electrode-copper. They are rolled with relatively tight dimensional tolerances and have smooth surfaces.

Figure 3:
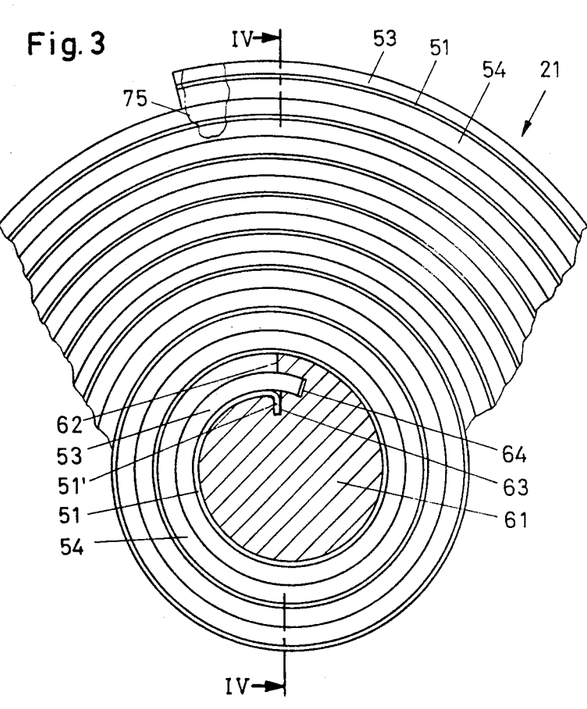
FIG. 3 illustrates the manufacture of one of the electrode units of the capacitor according to FIG. 1 on a coiling or winding mandrel.
Figure 4:
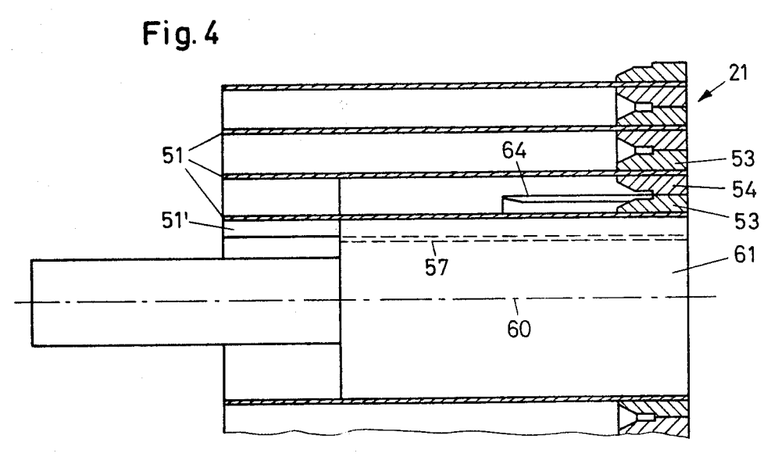
FIG. 4 is a section along the plane IV—IV in FIG. 3 and also shows the coiling mandrel expediently used in the manufacure of the electrode unit.

The manufacture of electrode unit 21 is conveniently carried out as follows:

A coiling or winding mandrel 51 (FIG. 3) pivotable about an axis 60 is used, as illustrated in FIGS. 3 and 4. The outer surface of the coiling mandrel 61 extends along a 360° turn of the spiral and the pitch of this winding is identical with the winding of the capacitor plate 51. Between the internal start and the external end of the spiral winding there is a radially extending step 62. A radial groove 63 is machined into the coiling mandrel 61 which is contiguous with the step 62. The groove 63 runs along the whole axial length of the coiling mandrel to accomodate a perpendicularly bent end lug 51' of the band-shaped capacitor plate 51. Another groove 64 is machined into the step 62 itself and extends from one end of the coiling mandrel 61 parallel to its pivotal axis 60. The width and the position of groove 64 is so chosen that one end part of one of the profile bars can be inserted approximately in a straight line into this groove 64. The profile bar is the one (53) which is to lie directly over the first turn of capacitor plate 61. The first turn of the band-shaped capacitor plate 51 and the first turn of profile bar 53 are produced simultaneously. Before the second turn of the capacitor plate 51 is formed, a second profile bar 54 is pushed between the outwardly facing surface of the first profile bar 53 and the inwardly facing surface of the capacitor plate 51, one end of the second profile bar 54 being brought to bear against the step 62. Thereafter, the three elements, namely the capacitor plate 51, the profile bar 53 and the profile bar 54 are wound together several times around the coiling mandrel 61 so that the said elements and the resulting turns are tightly wound, care being taken to ensure that the two profile bars 53 and 54 extend always flush with the longitudinal edge of the band-shaped capacitor plate 51. When the winding of the last required turn of the capacitor plate 51 and the profile bars 53 and 54 is completed, the thus produced coil is fixed by a weld 75 (FIG. 3) to connect the last turn of the mentioned elements to the previous turn. Then the outer ends of the band-shaped capacitor plate 51 and the two profile bars 53 and 54 are cut off. Thereafter the coil, manufactured this way for the electrode unit 21, is pulled off in the axial direction from the coiling mandrel 61 (to the right in FIG. 4) and brazed to the base plate 27.

The second electrode unit 22 is manufactured in an entirely similar way on another coiling mandrel (not shown), the outer surface of which runs along a 360° spiral line in the opposite winding direction. On this mandrel are wound the second band-shaped capacitor plate 52 together with the profile bars 53 and 54 serving as spacers. The finished coil for the second electrode unit 22 is then brazed to the disc 33.

When assembling the capacitor, the two electrode units 21 and 22, manufactured in the above-described way, are mutually offset by 180° about their common axis. Thus, the turns of the capacitor plate 51 of one electrode unit 21 are always centrally positioned between two adjacent or successive turns of the capacitor plate 52 of the other electrode unit 22 and vice versa.

Figure 5:
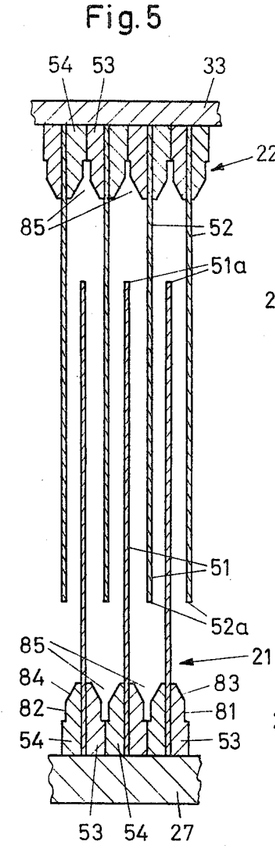
FIG. 5 illustrates a portion of the structure shown in FIG. 1 on an enlarged scale.
Figure 6:
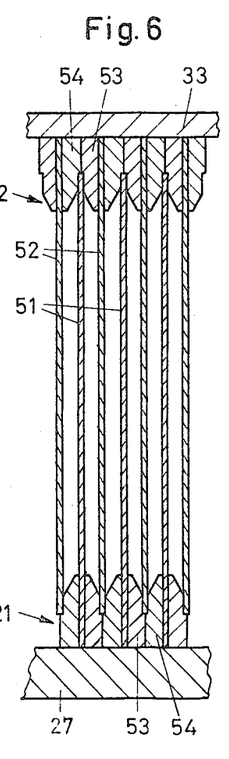
FIG. 6 is similar to FIG. 5 and shows a phase of the manufacture of the capacitor.

The exact arrangement and mutual centering of the two electrode units 21 and 22 are made considerably easier if the measures described below are followed. As shown in FIGS. 1 and 4, the profile bars 53 and 54 each have specially shaped cross-sections, which can be seen more clearly in FIG. 5 to which reference is now made. The cross-sections of the profile bars 53 and 54 are mirror images of one another. Each of the profile bars 53 and 54 has a respective step-like recess 81 and 82 and inclined planes 83 and 84 adjoining the recesses. These recesses and inclined planes are located on the mutually adjacent sides of the contiguously extending profile bars 53 and 54 and together form a central longitudinal groove 85 in the spacers 53, 54 which are between successive turns of the capacitors 51 and 52. The central longitudinal groove 85 is open towards the free longitudinal edges 51a and 52a of the respective capacitor plates and has a zone adjacent to the base of the groove the width of which is practically identical with the thickness of the capacitor plate 52 and 51, respectively, or is slightly larger. In the zone adjacent to the open mouth of the central longitudinal groove 85 the width of the groove increases towards its mouth. By pushing the two electrode units 21 and 22 axially into one another, the free longitudinal edges 51a of capacitor plate 51 can be meshed with the central longitudinal groove 85 in the spacers 53, 54 between the turns of the second capacitor plate 52, where, conversely, the free longitudinal edge 52a of the second capacitor plate 52 is engaged in the central longitudinal groove 85 in the spacers 53, 54 and thereby between the turns of the first capacitor plate 51, as illustrated in FIG. 6. This procedure ensures the exact alignment and centering of both electrode units 21 and 22 and their respective capacitor plates 51 and 52.

Figure 1:
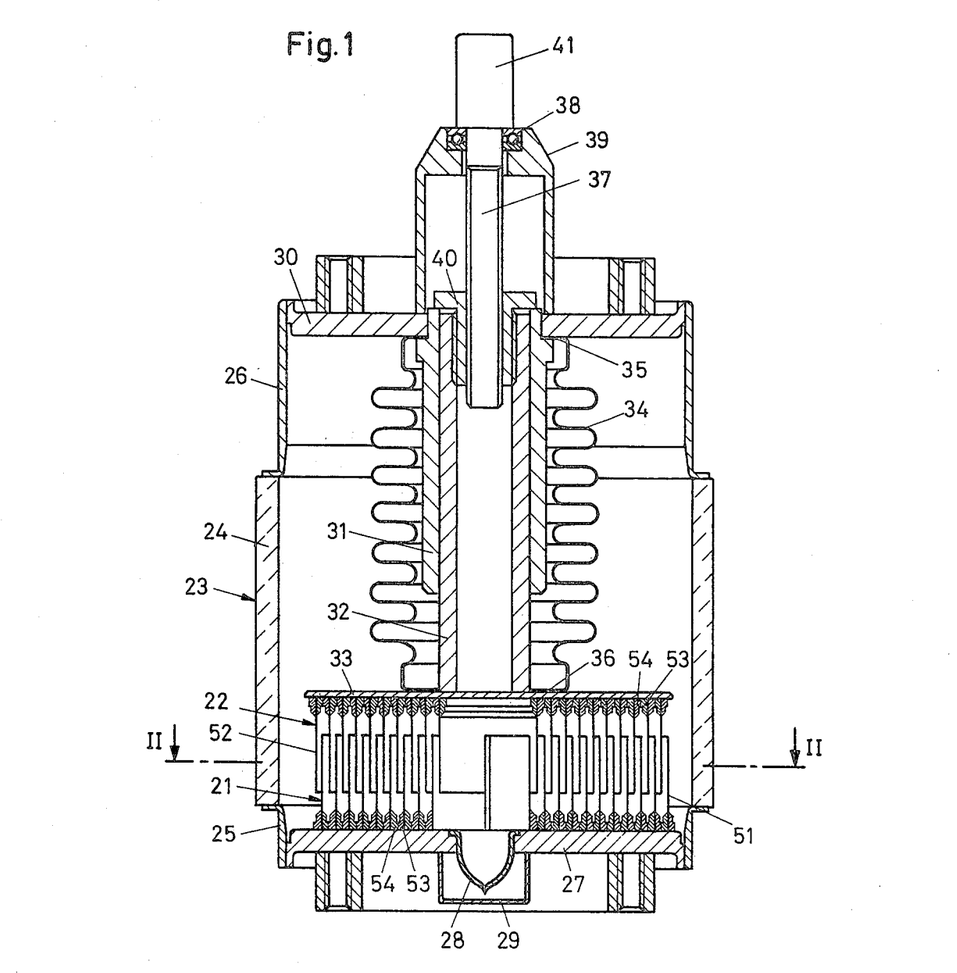
FIG. 1 is an axial longitudinal section of a first preferred embodiment of a vacuum capacitor of variable capacitance with spiral-wound capacitor plates.

Taking advantage of this possibility, the assembly of the capacitor, according to FIG. 1 is expediently carried out as follows: The lower and upper bells 25 and 26 are brazed to the previously metallised cylindrical ceramic or glass jacket 24. One electrode unit 21 is brazed concentrically to the base plate 27, which at this stage of the assembly is still separated from the other parts of the housing 23. Similarly, the second electrode unit 22 is brazed to one side of the disc 33 and at the same lower end of the inner tubular member 32 and the end flange 36 on the lower end of the bellows 34 are brazed to the other side of the disc 33. The cover plate 30 is at this stage of assembly still separated from the other parts of housing 23 and is then connected and brazed to the locating/guiding tubular member 31 and to the end flange 35 on the upper end of the bellows 34. Thereafter, the two electrode units 21 and 22 are pushed into one another until they are in the position shown in FIG. 6. By the engagement or mesh of the free longitudinal edges 51a and 52a of the capacitor plates 51 and 52 in the grooves 85 of the respective electrode units, the capacitor plates 51 and 52 are exactly aligned and both electrode units 21 and 22 are exactly centered with respect to one another. The screw spindle 37 is set in such a fashion that the cover-plate 30 and the base plate 27 have the correct distance from each other, which is identical with their spacing in the completed capacitor. While the electrode units 21 and 22 are still pushed completely into one another, as shown in FIG. 6, the housing enevelope assembled from the parts 24, 25 and 26 is pushed over the base plate 27 and the cover plate 30. Thereafter the circumferential edge of the base plate 27 is welded to the lower bell 25 and then the circumferential edge of the cover plate 30 is welded to the upper bell 26. During these welding operations the electrode units 21 and 22 remain in mesh with one another and are thus centered with respect to one another. Only after completion of the described assembly operations is the upper electrode unit 22 retracted from the lower electrode unit 21 by operating the screw spindle 37 until the electrode units are no longer touching one another. Finally, the interior of housing 23 is evacuated through the nipple 28 which is then sealed off.

With the described method a vacuum-capacitor can be produced the capacitor plates 51 and 52 which are perfectly aligned and centered with respect to one another. In this way it is possible to reduce the gap between the capacitor plates 51 and 52 of opposite polarity of the two electrode units 21 and 22 to a few tenths of a millimeter, e.g. 0.4 mm, without causing an electric flash-over (insulation break-down) at a peak test voltage of 5000 Volts at 50 Hertz. The capacitor plates 51 and 52 may each have a thickness of e.g. 0.25 mm.

Figure 7:
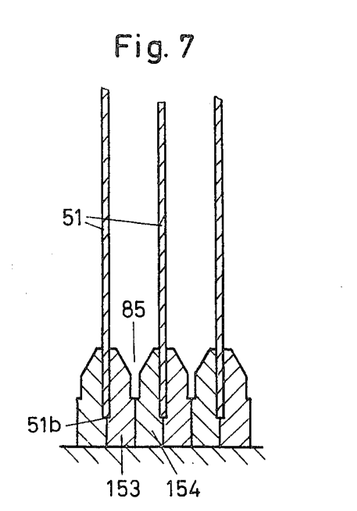
FIG. 7 to FIG. 10 respectively show in a fashion similar to the partial view in FIG. 5 of an electrode unit, four variants of embodiments of a capacitor according to FIG. 1.

FIG. 7 illustrates another preferred embodiment, where the spacer profile bars 153 and 154 between successive turns of the capacitor plate 51 have somewhat different cross-sectional shapes, such that each of the profile bars surrounds one-half of the longitudinal edge 51b of the band-shaped capacitor plate.

Figure 8:
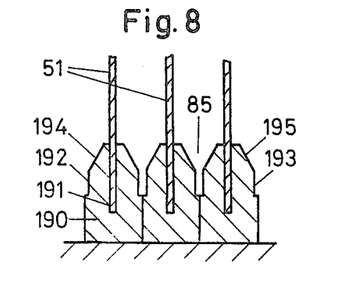

FIG. 8 shows a preferred embodiment where the spacing members between successive turns of the capacitor plate 51 are formed by two halves of one single profile bar 190. This latter has a central longitudinal groove 191 in which one of the longitudinal edges of the capacitor plate 51 is fixedly engaged. The profile bar 190 rises symmetrically from the two sides of the external faces of the capacitor plate. On the opposite external faces of the profile bar 190 step-like recesses 192, 193 and inclined planes 194, 195 are formed, the latter being contiguous with the recesses 192, 193, respectively. The opposite external faces of profile bar 190 are always directly in engagement on successive turns of the profile bar 190, whereby again the step-like recesses 192 and 193 together form a groove 85 running in the middle between the turns of the capacitor plate 51. The inclined planes 194 and 195 form a wedge-shaped widening of the groove 85 extending towards its mouth.

Figure 9:
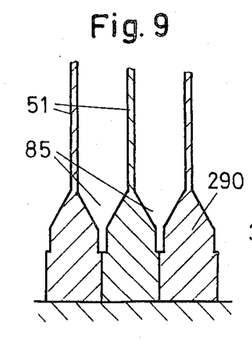

FIG. 9 shows a preferred embodiment where the band-shaped capacitor plate 51 and a profile bar 290 are made of one piece. The cross-section of the profile-bar 290 is identical with the one shown in the embodiment according to FIG. 8 so that here also a central longitudinal groove 85 is formed between the turns of the capacitor plate 51.

Figure 10:
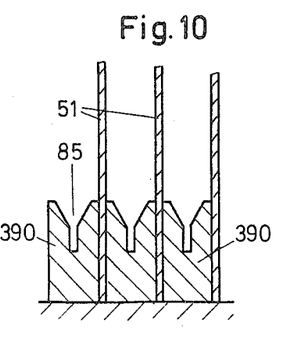

FIG. 10 illustrates an embodiment where the spacer between the adjacent turns of the band-shaped capacitor plate 51 is formed by one single profile bar 390 including a central longitudinal groove 85.

It is clear that there are other possible embodiments with other cross-sections as spacers between successive turns of each of the profile bars serving as capacitor plates. The basic idea of the invention remains, however, invariably the same.

Figure 11:
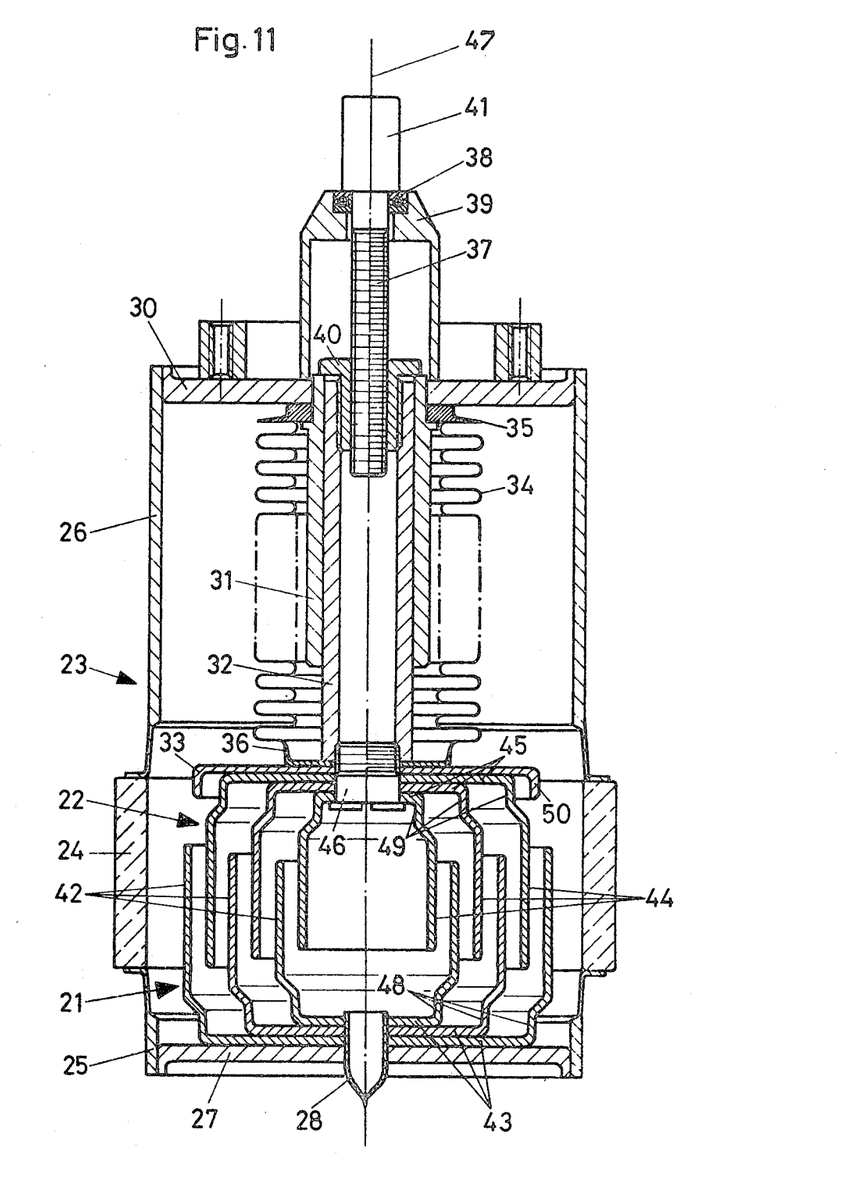
FIG. 11 shows in axial longitudinal section another embodiment of a vacuum capacitor of variable capacitance with cylindrical capacitor-plates.

The electric vacuum-capacitor illustrated in FIG. 11 differs from the one according to FIG. 1 only in that the two electrode units 21 and 22 are differently constructed, as described herebelow. The rest of the elements of the capacitor are essentially the same as in the first-described embodiment and the reference numbers used therein are identical with the ones used in FIG. 1.

A fixed electrode unit 21 comprises a plurality of cylindrical capacitor plates 42, which are the peripheral walls of coaxially arranged cups 43. The bottoms of these cups are brazed or welded to each other and to the base plate 27. A displaceable electrode unit 22 also comprises several cylindrical capacitor plates which form the circumferential walls of coaxially arranged cups 45. These cups are connected by a spigot 46 to the tubular member 32 and to the disc 33. In addition, the cups 45 are brazed or welded to one another and to the disc 33. The radial distance or gap between two adjacent capacitor plates 42 of the fixed electrode unit 21 is larger than the thickness of the capacitor plates 44 of the displaceable electrode unit 22. Similarly, the radial distance or gap between two adjacent capacitor plates 44 of the displaceable electrode unit 22 is larger than the thickness of the capacitor plates 42 of the fixed electrode unit 21. Furthermore, all capacitor plates 42 and 44 have different diameters and are arranged so that at least a few of the capacitor plates 42 of the fixed electrode unit 21 project into the gap between the plates of the displaceable electrode unit 22 and vice versa. The generatrices of the envelope of the cylindrical capacitor plates 41 and 44 run parallel to the longitudinal axis of the tubular member 31 and 32 and of the screw sprindle 37. It is, therefore, possible to displace the displaceable electrode unit 22 relative to the fixed electrode unit 21 by turning the screw spindle 37. This is done to change the depth of the engagement or mesh of the capacitor plates 42 and 44 in the gaps between capacitor plates 44 and 42, respectively, of the other electrode unit in order to change the capacitance of the capacitor.

Each of the cups 43 of the fixed electrode unit 21 has a transition zone extending between the peripheral walls forming the capacitor plates 42 and the bottom of the cups, which zone is formed with an annular shoulder 48 radially offset inwardly relative to the capacitor plate 42. These shoulders 48 are so positioned that they form locating guides for the free lateral edges of the capacitor plates 44 of the displaceable electrode unit 22 when the two electrode units 21 and 22 are pushed completely into one another. Similarly, in the corresponding transition zone of each of the cups 45 of the displaceable electrode unit 22 extending between the peripheral walls forming the capacitor plates 44, an annular cylindrical and radially inwardly offset shoulder 49 is formed. These shoulders 49 are so positioned that they form locating guides for the lateral edges of the capacitor plates 42 of the fixed electrode unit 21 when both electrode units 21 and 22 are pushed completely into one another. The disc 33 has a collar-like cylindrical circumferential edge 50 which is positioned such that it provides a locating guide for the free lateral edge of the outermost capacitor plate 42 of the fixed electrode unit 21.

Figure 12:
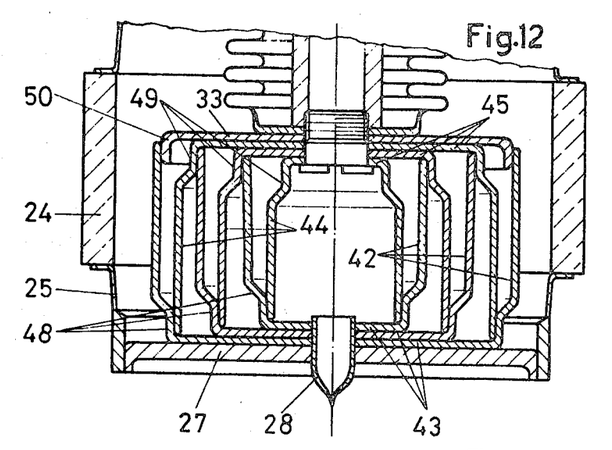
FIG. 12 is a view similar to FIG. 11 showing the same capacitor in the position where the electrode units are pushed completely into one another, for assembly of the capacitor.

FIG. 12 illustrates how the shoulders 48 and 49 and circumferential edge 50 co-operate with the free lateral edges of the capacitor plates 44 and 42, respectively, when the two electrode units 21 and 22 are pushed completely into one another, whereby all capacitor plates 42 and 44 are exactly aligned with respect to one another and the distances or gaps between the adjacent, radially arranged plates always remain the same and uniform.

One expediently proceeds with the assembly of the capacitor according to FIG. 11 as follows:

The cover plate 30 is connected to the tubular member 31 and to the upper end flange 35 of the bellows 34. The lower end of bellows 34 is connected to the disc 33. The inner tubular member is pushed into the outer tubular member 31. The cups 45 and the disc 33 are secured at the lower end of the inner tubular member 32 by the spigot 46. Thereafter, the cups 43 are successively pushed over the cups 45 such that the shoulders 48 of the first-mentioned cups 43 are engaged in the free lateral edges of the capacitor plates 44 of the cups 45 and, at the same time, the free lateral edges of the capacitor plates 42 of the cups 43 are engaged with the shoulders 49 of the cups 45, or with the circumferential edge 50 of the disc 33, as shown in FIG. 12. This results in positive centering of the cups 43 and 45 in the exact alignment of the capacitor plates 42 and 44 in relation to one another. The base plate 27 is placed on the bottom of the outermost cup 43. In this position, when the cups 43 and 45 are completely interleaved the bottoms of the upper cups 45 are brazed together and to the disc 33 and the lower end of the tubular member 32, and the bottoms of the lower cups 43 are brazed together and to the base plate 27. This brazing can be carried out in one operation. While the cups 43 and 45 are still in the position where they are fully interleaved, as shown in FIG. 12, the housing consisting of parts 24, 25 and 26 is pushed over the base plate 27 and over the cover plate 30. Thereafter, the circumferential edge of base plate 27 is welded to the lower bell 25 and the circumferential edge of the cover plate 30 is welded to the upper bell 26. During these welding operations the cups 43 and 45 remain in located engagement and thus remain centered with respect to one another. Only after completion of the described assembly operations is the displaceable electrode unit 22 pulled out or disengaged from the fixed electrode unit 21 by means of the screw spindle 37 to such an extent that the electrode units are no longer touching one another. Finally, the interior of housing 23 is evacuated through the nipple or tubulation 28 and thereafter the latter is sealed off.

Figure 13:
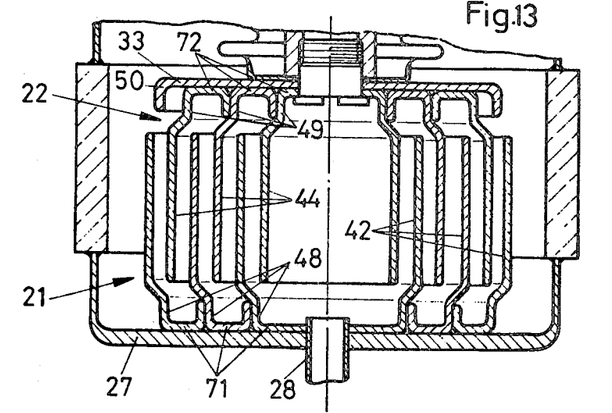
FIG. 13 illustrates a partial axial longitudinal section of another embodiment of a vacuum capacitor of variable capacitance with cylindrical capacitor plates.
Figure 14:
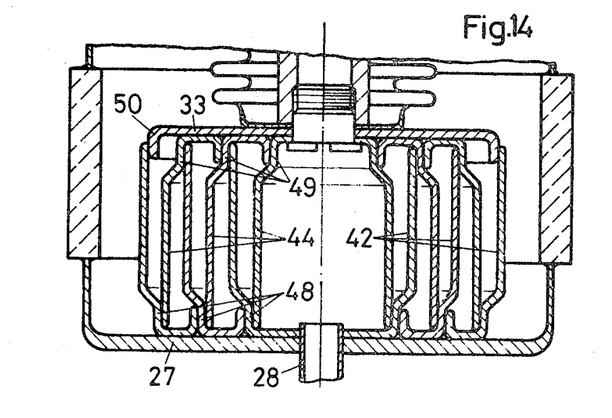
FIG. 14 is a sectional view similar to FIG. 13 and showing the same capacitor in the position where the electrode units are pushed completely into one another, for assembly of the capacitor.

The embodiment shown in FIGS. 13 and 14 differs from the embodiment previously described only in that the cylindrical capacitor plates 42 and 44, with the exception of the innermost one, do not form the peripheral walls of a cup or can, but each of them has annular flanges 71, 72 respectively located on the base plate 27 and on the disc 33 respectively and are fixed thereto. Also, the flanges 71 serve as distance holders or spacers between adjacent capacitor plates 42 of the fixed electrode unit 21. Similarly, the flanges 72 serve as distance holders or spacers between adjacent capacitor plates 44 of the displaceable electrode unit 22. As previously described, in the embodiment according to FIGS. 13 and 14, each of the capacitor plates 42 and 44 have radially inwardly offset cylindrical shoulders 48, 49 respectively which are in locating engagement with the free lateral edges of the capacitor plates of the other electrode unit, when both electrode units 21 and 22 are completely interleaved, as shown in FIG. 14. In this embodiment there is also a collar-like circumferential edge 50 on the disc 33, which serves the purpose of locating and guidance for the free lateral edge of the outermost capacitor plate 42. When the electrode unit 21 and 22 are completely meshed with one another, then due to the engagement of their free lateral edges with the locating-shoulders 48 and 49, and with the circumferential edge 50, they are exactly aligned and centered. The assembly of the capacitor according to FIG. 13 and FIG. 14 is carried out basically in the same way as in the previously described embodiments.

Figure 15:
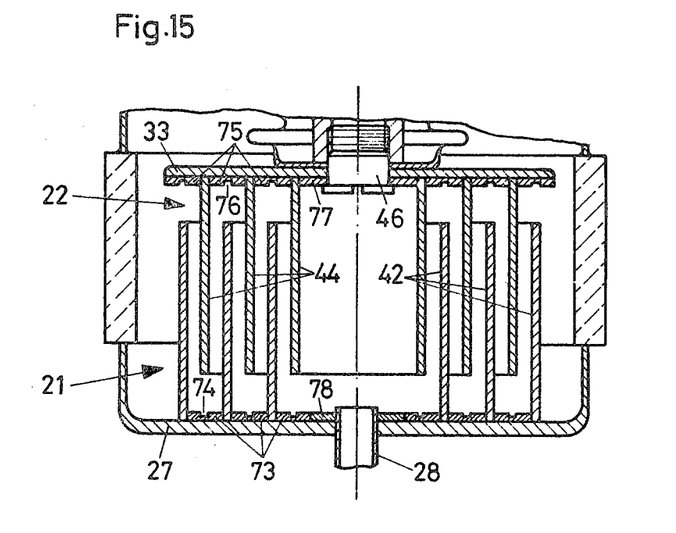
FIG. 15 illustrates the last preferred embodiment of a vacuum capacitor of variable capacitance with cylindrical capacitor plates, also in a partial longitudinal section.
Figure 16:
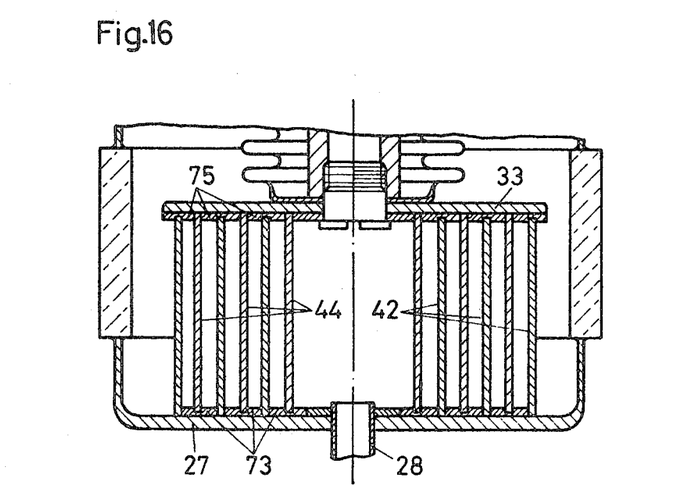
FIG. 16 is a sectional view similar to FIG. 15 and showing the same capacitor in the position where the electrode units are pushed completely into one another, for assembly of the capacitor.

In another embodiment illustrated in FIGS. 15 and 16, the capacitor plates 42 and 44 are constructed as straight tubular sections. In contrast to the embodiments described before, here there are no radially inwardly offset locating shoulders 48 and 49. Directly inside and within each capacitor plate 42 of the fixed electrode unit 21, there is a ring-shaped body 73 connected to the base plate 27. The ring-shaped body 73 has a circumferentially running groove 74 in which the lateral edges of the opposite capacitor plate 44 of the displaceable electrode unit 22 can be engaged. With the exception of the innermost one, the ring-shaped bodies 73 serve as distance-holders or spacers between successive capacitor plates 42 of the electrode unit 21. Directly outside each of the capacitor plates 44 of the displaceable electrode unit 22, a ring-shaped body 75 is arranged, which is connected to the disc 33 and has a circumferentially running central groove 76. The free lateral edge of the oppositely placed capacitor plate 42 of the fixed electrode unit 21 can be brought into locating engagement with the central groove 76. With the exception of the outermost one, the ring-shaped bodies 75 serve as spacers between successive capacitor plates 44 of the electrode unit 22. When the two electrode units 21 and 22 are completely interleaved with one another, the free lateral edges of the capacitor plates 42 engage in the groove 76 of the ring-shaped body 75 and, conversely, the free lateral edges of the capacitor plates 44 engage in the groove 74 of the ring-shaped body 73, as shown in FIG. 16. The flanks of grooves 76 and 74 produce an accurate alignment of the free lateral edges of the capacitor plates 42 and 44. Directly inside and within the innermost capacitor plate 44 of the displaceable electrode unit 22, a centering disc 77 is arranged. The previously mentioned spigot 46 runs through the centering disc 77. Similarly, directly within the innermost ring-shaped body 73, located on the base plate 27, there is a centering disc 78. The connecting piece 28 runs through the centering disc 78.

For the assembly of the vacuum capacitor according to FIGS. 15 and 16, the electrode units 21 and 22 are completely meshed with one another, as shown in FIG. 16, whereby the capacitor plates 42 and 44 and also the ring-shaped bodies 73 and 75 are correctly positioned, while the capacitor plates 42 and the ring-shaped bodies 73 are brazed to the base plate 27 and the capacitor plates 44 and the bodies 75 are brazed to the disc 33. The electrode units 21 and 22 always remain interleaved in one another, as shown in FIG. 6, during the completion of the assembly of the electrode units into the housing 26. Thereafter, the displaceable electrode unit 22 is displaced upwardly by operating the spindle 37 (FIG. 11) until the electrode units are no longer touching each other.

In non-illustrated variants of the embodiments according to FIGS. 11 and 12, and FIGS. 13 and 14, respectively, the locating shoulders 48 and 49 can be radially offset outwardly instead of being offset inwardly. This will result in the same advantages and properties.

In a similarly non-illustrated variant of the embodiment according to FIGS. 15 and 16, two directly adjacently disposed ring-shaped parts can be provided, instead of each of the ring-shaped bodies 73 or 75, which parts are provided, on each of their sides facing one another, with a step-like recess so that the two recesses together form the grooves 75, 76.

In another non-illustrated variant of the embodiment according to FIGS. 15 and 16, the ring-shaped body 73, the centering disc 78, the ring-shaped body 75 and the centering disc 77 can each be replaced by a circular disc with grooves 74, 76, respectively, and with further grooves to provide a permanent insertion of the capacitor plates 42, and 44.

The assembly of the above-described capacitors may be further simplified if the bell 25 and the base plate 27 are formed as a one-piece construction element and similarly, the bell 26 and the cover plate 30 are formed as a one-piece construction element. In this case the electrode units 21 and 22 can be fixed to their respective supports 27 and 33 in one brazing operation and the bells 25 and 26 can be fastened in the cylinder 24 in one single brazing operation. During these brazing operations the electrode units 21 and 22 remain completely interleaved in one another.

By the preferred embodiments of the invention described above the production of capacitors with exactly aligned capacitor plates is made considerably easier. The plates need not be cylindrical in each case; the advantages of the invention will be evident for a man skilled in the art when flat planar plates are used as capacitor plates.

What is claimed is:

1. An electric capacitor comprising two electrode units, each electrode unit having at least one capacitor plate arranged such that a plurality of capacitor plate portions with parallel mutually oppositely facing surfaces are provided, and a support for said at least one capacitor plate, said at least one capacitor plate having two oppositely positioned lateral edges, one of which is free and the other is fixedly secured to the support, a gap being defined between the oppositely facing surfaces of the capacitor plate portions, said gap being greater than the thickness of said at least one capacitor plate of the other electrode unit, the respective capacitor plate portions of the two electrode units being intermeshed and the mutually facing surfaces of the capacitor plate portions being parallel to a straight line along which one electrode unit is adjustable relative to the other for varying the extent of intermeshing of the capacitor plate portions of both electrode units, guiding means being provided at each electrode unit adjacent said support, said guiding means being arranged to engage the free lateral edge of said at least one capacitor plate of the other electrode unit for individually centering all capacitor plate portions of each electrode unit with respect to the capacitor plate portions of the other electrode unit when the two electrode units are set to a maximum extent of intermeshing of their capacitor plate portions while in other settings of the electrode units the guiding means are out of engagement with said at least one capacitor plate of the other electrode unit, at least one body being connected to the support for said at least one capacitor plate of each electrode unit and including grooves having flanks which constitute said guiding means.

2. A capacitor according to claim 1, wherein said at least one body is a spacer between adjacent capacitor plate portions belonging to the respective electrode units, said grooves being arranged centrally in the respective spacers.

3. A capacitor according to claim 2, wherein said capacitor plate portions belonging to each electrode unit are formed by turns of a single spirally coiled capacitor plate, and the spacers are formed by turns of a single spirally wound profile bar having the centrally arranged groove, said profile bar extending along the lateral edge of the plate, which is secured to said support.

4. A capacitor according to claim 3, wherein said capacitor plate portions belonging to each electrode unit are formed by turns of a single spirally coiled capacitor plate, and the spacers are formed by turns of a pair of spirally wound directly adjacently extending profile parts, said groove being formed by step-like recesses formed on mutually facing sides of said profile parts, said pair of profile parts extending along the lateral edge of the plate, which is secured to said support.

5. A capacitor according to claim 3, wherein said capacitor plate portions belonging to each electrode unit are formed by turns of a single spirally coiled capacitor plate, and the spacers are formed by turns of respective halves of a spirally wound profile bar which extends along the lateral edge of the plate secured to the support and which protrudes on opposite sides of the plate, said groove being formed by step-like recesses on opposite outer sides of the profile bar.

6. An electric capacitor comprising two electrode units, each electrode unit comprises a plurality of coaxially arranged cylindrical capacitor plates, each electrode unit having at least one capacitor plate arranged such that a plurality of capacitor plate portions with parallel mutually oppositely facing surfaces are provided, and a support for said at least one capacitor plate, said at least one capacitor plate having two oppositely positioned lateral edges, one of which is free and the other is fixedly secured to the support, a gap being defined between the oppositely facing surfaces of the capacitor plate portions, said gap being greater than the thickness of said at least one capacitor plate of the other electrode unit, the respective capacitor plate portions of the two electrode units being intermeshed and the mutually facing surfaces of the capacitor plate portions being parallel to a straight line along which one electrode unit is adjustable relative to the other for varying the extent of intermeshing of the capacitor plate portions of both electrode units, guiding means being provided at each electrode unit adjacent said support and being constituted by radially offset portions of the capacitor plates, said guiding means being arranged to engage the free lateral edge of said at least one capacitor plate of the other electrode unit for individually centering all capacitor plate portions of each electrode unit with respect to the capacitor plate portions of the other electrode unit when the two electrode units are set to a maximum extent of intermeshing of their capacitor plate portions while in other settings of the electrode units the guiding means are out of engagement with said at least one capacitor plate of the other electrode unit, each said guiding means being constituted by at least one surface portion extending in a direction parallel to said straight line.

* * * * *